Nov. 29, 1938.   K. H. SUNDÉN   2,138,433
CASTER
Filed Feb. 20, 1937   3 Sheets-Sheet 3
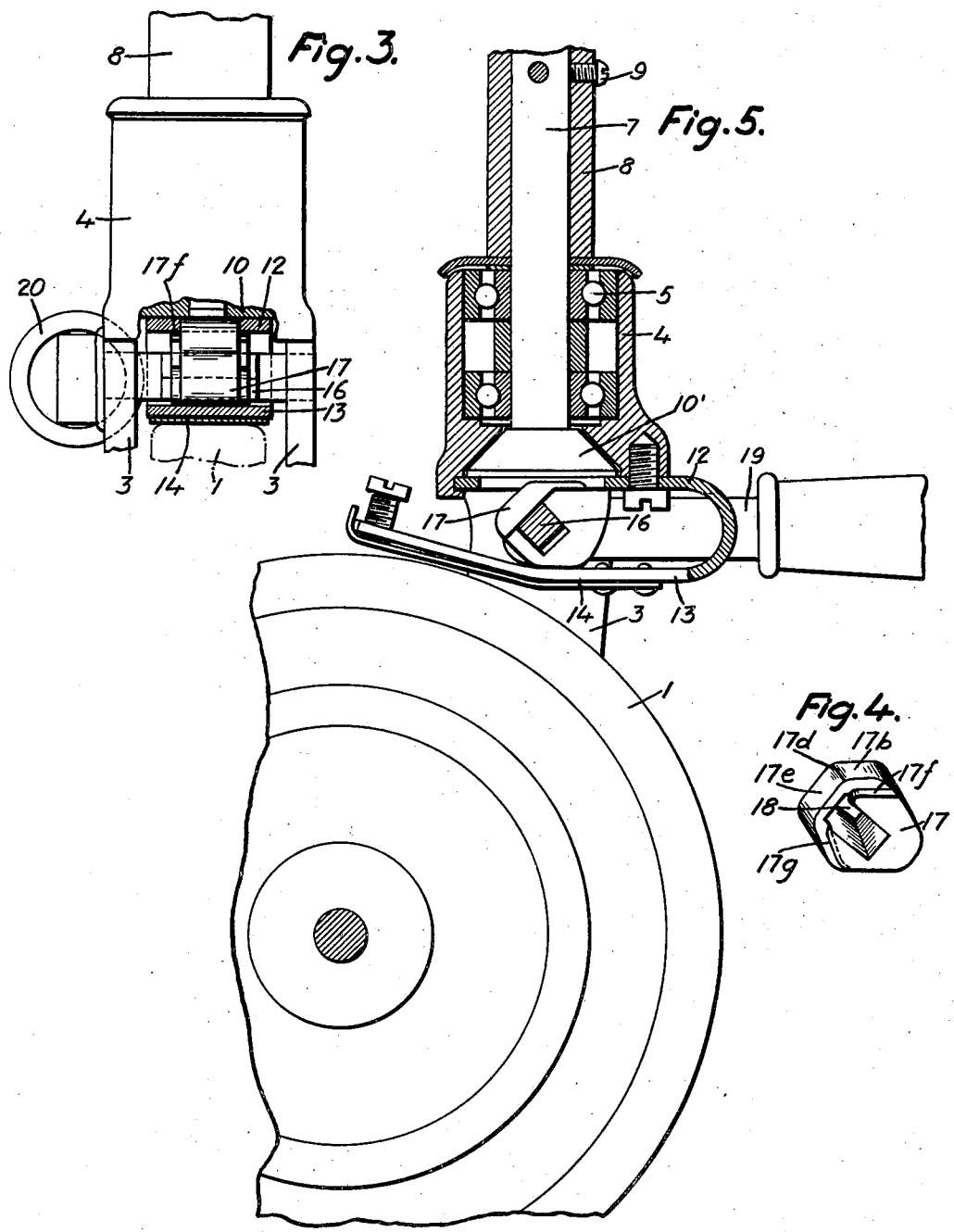

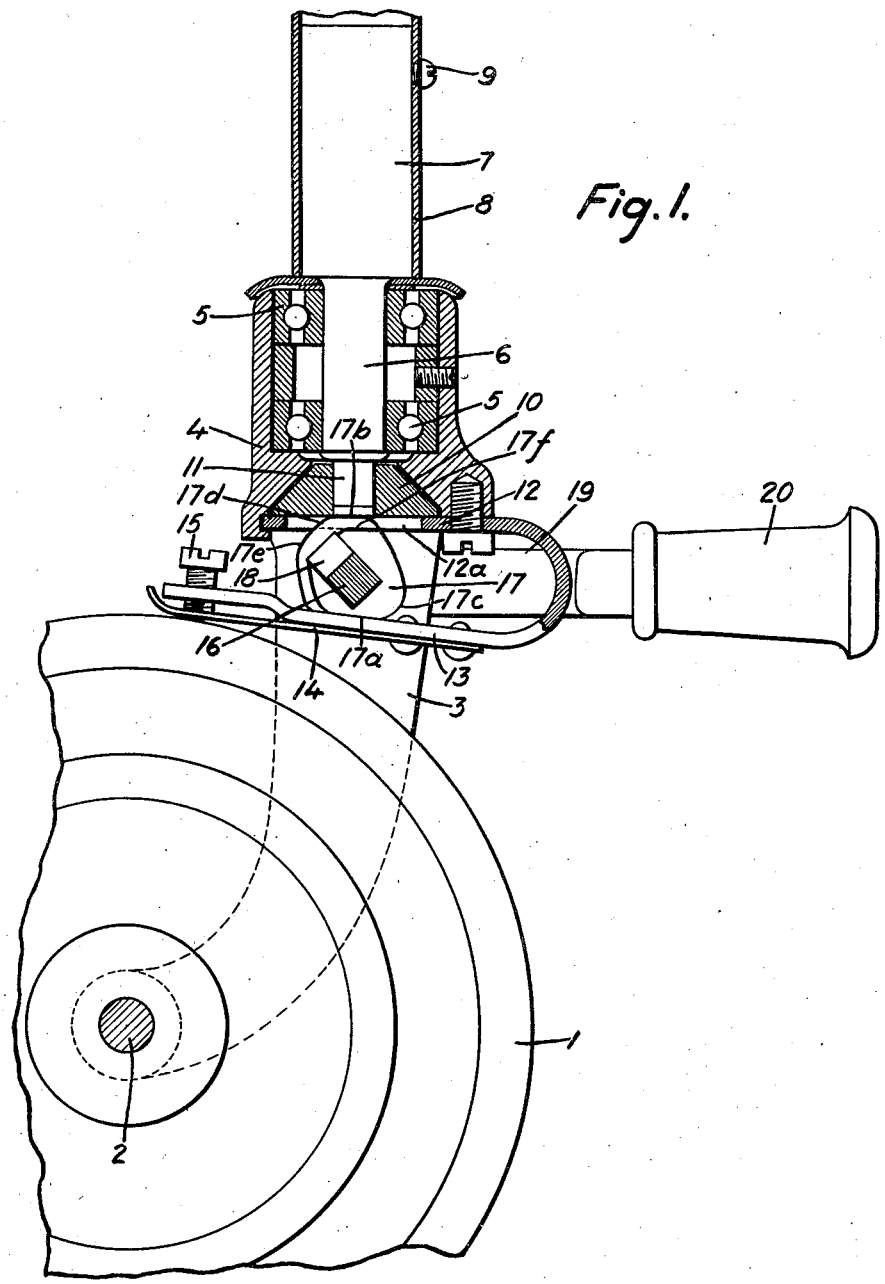

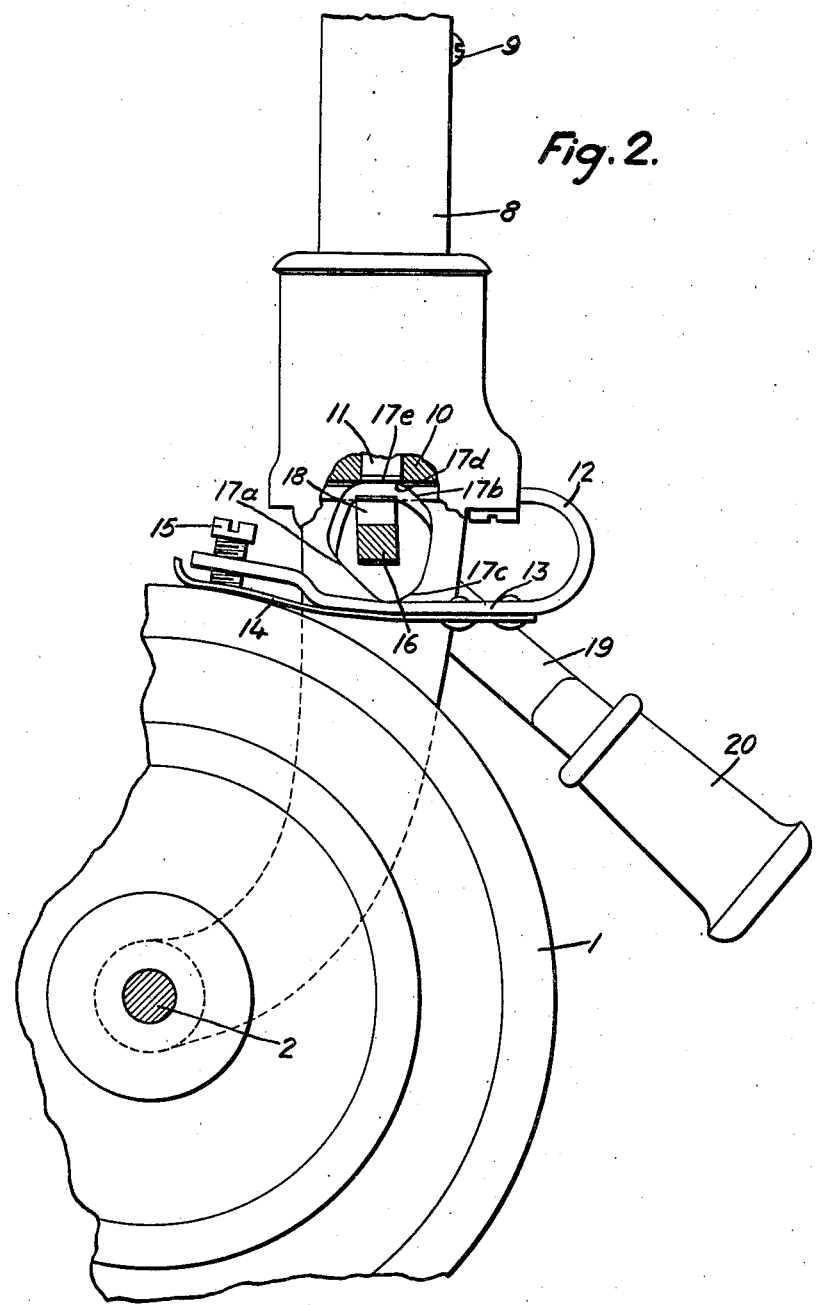

Patented Nov. 29, 1938

2,138,433

UNITED STATES PATENT OFFICE 2,138,433

CASTER

Karl Henrik Sundén, Lindesberg, Sweden

Application February 20, 1937, Serial No. 126,894
In Sweden February 22, 1936

9 Claims. (Cl. 16—35)

The present invention relates to improvements in a caster in which the wheel is mounted in a fork or an arm and self adjustable in various directions of motion by the fork turning around a vertical shaft in a bearing of an article to be transported and in which the wheel and the fork are lockable by means of two brakes, one of which locks the wheel and the other the fork by means of an operating device.

One object of the invention is an improved device wherein the brakes can be applied simultaneously against the proper parts.

A further object is to so embody a cam member that it can be placed between the two brakes and, when actuated, simultaneously and directly applies one brake against the wheel and the other against the fork.

With these and other objects in view, the invention consists in the construction and combination of elements hereinafter set forth, pointed out in the claims and illustrated by the accompanying drawings, in which Figure 1 is a lateral elevation of part of a wheel with appertaining bearing device, partly in section.

Figure 2 is a similar lateral elevation, the brakes being in their braking position.

Figure 3 is a partial front elevation, partly in section of Figure 1.

Figure 4 is a perspective view of the cam member, and

Figure 5 shows the same view as Figure 1 but in a modified embodiment.

Referring to the drawings, the reference numeral 1 indicates the wheel of a caster and 2 the horizontal axis of rotation of the wheel on which the arms 3 of a fork are mounted, the head or stem of the fork being indicated by 4. The fork is mounted by means of an anti-friction bearing device, or a ball bearing 5, so as to be turnable on a reduced portion 6 of a shaft or pintle 7 which is connected to a mounting part of the object to be transported. In the present embodiment the shaft is fixed on a tubular leg 8 by means of one or several screws 9.

On the upper side of the fork stem 4 a guard ring and a packing ring are clamped under the tube 8 and the shaft 7. The shaft portion 6 has a downwardly directed, narrower end portion 11 of square or other non-circular cross section, the shaft end extending into a correspondingly shaped recess in a conical body 10 serving as a brake device for the fork. The conical body is held in position with insignificant play, for example a few millimetres, in a conical cavity in the fork stem by a leg 12 of a U-shaped resilient plate or yoke secured to the underside of the fork stem by means of a flange and a screw or the like and provided with a recess 12a.

Viewed from the wheel axis, the curved portion of the yoke is located in front of the fork, and the other leg 13 of the yoke projects to a position adjacent and above the tire of the wheel, which tire may be made for example of rubber. According to the embodiment the underside of the leg 13 has a brake portion in the form of a spring 14 adapted to engage the wheel and arranged adjustably relatively to the leg by a screw 15 to enable regulation of the spring according to the wear of the rubber tire.

A member 17 provided with cam surfaces is so arranged on a square shaft 16 turnably mounted between the fork arms 3 that it is located between the legs 12 and 13 of the yoke. The cam member can carry out a transverse and radial motion respectively on its shaft 16 because the opening for the shaft provided in the member is extended so as to form a longitudinal slot 18 of rectangular cross section, the longitudinal direction of the slot substantially coinciding with a line extending perpendicular from the cam surface 17e. The longitudinal part 17e of the cam surface is approximately a plane. Moreover, the cam member has two abutting or resting surfaces 17a and 17b which are substantially diametrically located.

The portions of the cam member provided with the surfaces 17b, 17d, and 17e are bevelled off so that they are thinner than the rest of the eccentric and have the same width as the aperture 12a in the leg 12. On the shoulders of the cam member there are formed surfaces 17f and 17g. The shoulders 17f rest against the edges of the recess 12a in the leg 12. The ridges 17f are located at a distance from the surface 17b, with which they run parallel, which distance does not exceed the thickness of the leg 12 so that in the position shown in Figure 1 the surface 17b does not extend above the upper surface of the leg, in order to prevent an unintentional actuation of the brake body 10 and, simultaneously, an axial displacement of the cam member.

The cam member 17 is actuated by a handle or a treadle 19 secured to one end of the shaft 16 and fitted with a rubber collar 20 or the like.

When the brake members 10 and 13, 14 are not actuated, Figure 1, and the cam member is in its inoperative position, the surface 17a rests against the yoke leg 13, and the cam member is in such a position on the shaft 16 that it is displaced upwards. The positions of the various surfaces relatively to the center of the shaft will be clear from Figure 1. As already mentioned, the portion carrying the surface 17b is inserted in the recess 12a so that the surface 17b will be approximately at a level with the upper surface of the leg 12, and the brake body 10 has then sunk on the axle-journal 11 towards the leg 12 and the surface 17b. The surface 17a and the edges 17f provided with plane surfaces insure that the cam member 17 loaded by the horizontally projecting treadle 19 is retained in an inoperative position and that it is stopped in this horizontal position when being raised from its lowered position. In the horizontal position the treadle acts as a buffer device in case the wheel comes in the neighbourhood of a wall or the like because of the self adjustment of the wheel the treadle always is in the direction of motion in front of the wheel.

When the treadle 19 is moved downwards the cam surface 17d, 17e of the eccentric actuates the brake body 10 so that it is applied against the fork stem, whereby the cam member is displaced somewhat downwards on the shaft 16. However, at the same time the cam surface 17c actuates the leg 13 so that the brake spring 14 is pressed against the wheel and, due to the counterpressure of the leg 13, the middle portion of which is subjected to a pressing downwards and acts as a resilient abutment, the cam member has a tendency to be displaced on the shaft in the opposite direction, which, however, only takes place to a very small extent due to the opposite pressure arising between the cam surface 17d, 17e and the brake body. Thus, the leg 13 tends to press the cam member bodily upwards which movement is resisted by the brake 10 acting against the surface 17e. Thus the brake 10 is pressed still more into its position. The locked cam member acts so that the brake spring 13 is pressed with great force towards the wheel.

Thus, when turned the cam member 17 will simultaneously actuate the two brakes to cause engagement thereof against the proper parts and to release the same respectively. On account of its mobility on the shaft 16 and the resilient nature of the leg 13 the cam member adjusts itself between the two brakes 10 and 13, 14.

A particularly simple and advantageous embodiment is shown in Fig. 5. The conical body 10' is rigidly connected to the shaft 7, and the body 10' is adapted to fit snugly in its conical recess so that the parts can very easily swing. When the treadle 19 is moved downwards, the cone 10' with the shaft 7 is pressed upwards. Thus the normal freefitting between the body 10' and the conical surface is transformed into a close fit, so that braking action takes place. Due to the counter-pressure of the tire efficient braking is effected. In normal cases the load on the shaft 7 is lower than the counter-pressure from the tire. Therefore, the displacement of the shaft by play in the bearings 5 can take place. In other respects the device is constructed and operates as previously described.

In Figure 5 also a somewhat modified embodiment of the parts 13, 14 is shown.

The device according to the invention is applicable to all articles that are to be moved on wheels or rollers such as trolleys, platform cars, invalid transport means, and furniture, for example tables, chairs, beds, shelves, cupboards, and the like.

In addition to those already indicated, modifications of the shown embodiment are possible within the scope of the invention.

Having now described my invention, what I claim as new and desire to secure by Letters Patent is:

1. In a caster, a fork having a vertically extending head portion rotatably mounted on a pintle of an article to be transported, a wheel mounted in said fork, two brakes, one for locking the wheel comprising a resilient plate secured to the fork and projecting along the peripheral portion of the wheel, the other of said brakes being adapted to lock the fork comprising a body non-rotatably mounted on the pintle adjacent the head portion of the fork and slidable with respect thereto, and a cam member rotatably mounted on the fork between the two brakes adapted when turned to simultaneously cause engagement of said body with the fork head and move the resilient plate into engagement with the wheel so as to lock said parts against rotation.

2. A caster according to claim 1 characterized by the fact that the fork brake comprises a member which tapers upwardly towards the fork head, and the fork head is provided with a tapered recess in which said member is mounted.

3. A caster according to claim 1 characterized by the fact that the cam member is mounted on a shaft and adapted to be turned thereby between the arms of the fork, said cam member having a slot therein so that the cam may move transversely on the shaft.

4. A caster according to claim 1 characterized by the fact that the resilient brake plate consists of one leg of a U-shaped yoke the curved portion of which extends beyond the forward edge of the fork, the free end portion of said brake leg extending adjacent the wheel tire in order to engage the same, the other leg of the yoke being fixed to the under side of the fork head so as to retain the body of the fork brake in position at the end of the pintle.

5. A caster according to claim 1 characterized by the fact that a portion of the resilient brake plate is fixed to the underside of the fork head and provided with an aperture through which a portion of the cam member extends so as to engage the body forming a part of the fork brake.

6. A caster according to claim 1 characterized by the fact that on the underside of the resilient brake plate there is provided a yieldable brake plate which is adjustable relative to the resilient plate so as to provide compensation for the wear of the wheel tire.

7. In a caster having a vertically extending stem rotatably mounted on a pintle of an article to be transported, a wheel rotatably mounted in said fork, two brakes one for locking the wheel comprising a resilient plate secured to the fork and projecting along the peripheral part of the wheel, the other of said brakes being adapted to lock the fork comprising a conical body non-rotatably connected to said pintle and slidable thereon relative to the stem of the fork, said stem having a recess for receiving said body, and a cam member rotatably mounted on the fork between the two brakes adapted when turned to simultaneously actuate the two brakes and cause engagement of the conical body with the fork stem and the projecting portion of the resilient plate with the wheel so as to lock said parts against rotation.

8. A caster according to claim 7 wherein the cam member is provided with two plane surfaces located diametrically opposite each other, said surfaces extending respectively adjacent the brake body and the resilient plate in the inoperative position of the cam member so as to retain said cam member in the inoperative position.

9. A caster according to claim 7 characterized by the fact that the cam member is provided with a plane surface for engaging the fork brake body so that in the operative position of the cam said surface rests against the fork brake so as to retain the cam member in its operative position.

KARL HENRIK SUNDÉN.